(No Model.)
H. E. MOFFAT.
FEED WATER PURIFIER FOR BOILERS.
No. 540,751. Patented June 11, 1895.
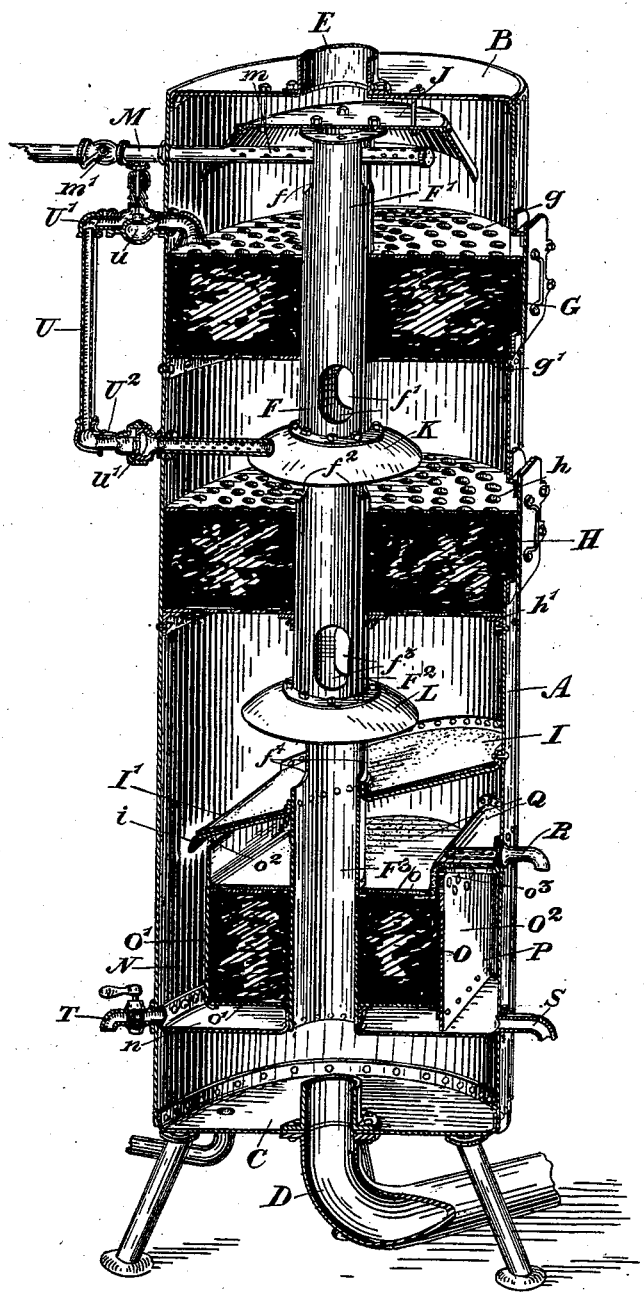
Witnesses.
W. J. Withrow
E. R. Case
Inventor.
H. E. Moffat.
by Fetherstonhaugh & Co.
attys

UNITED STATES PATENT OFFICE.

HENRY ESSON MOFFAT, OF GALT, CANADA.

FEED-WATER PURIFIER FOR BOILERS.

SPECIFICATION forming part of Letters Patent No. 540,751, dated June 11, 1895.

Application filed September 25, 1894. Serial No. 524,043. (No model.)

*To all whom it may concern:*

Be it known that I, HENRY ESSON MOFFAT, manufacturer, of the town of Galt, in the county of Waterloo, in the Province of Ontario, Canada, have invented certain new and useful Improvements in Feed-Water Purifiers for Boilers, of which the following is a specification.

My invention relates to improvements in heaters and purifiers for the feed water of boilers and the objects of the invention are, first, to design a means whereby in the final filtering of the water all the lime, clay and quick sand will be entirely removed and the water otherwise thoroughly purified and entirely separated when purified from the portion being purified without the danger of any steam being generated in the final filtering chamber, and, secondly, to provide means whereby should the first filter become choked up of removing such filter and utilizing the remaining filters from the water without the necessity of having to stop the entire plant in order to clean the uppermost filter and it consists essentially, first, of constructing the lower portion of the feed water heater with an inclined deflecting plate preferably covered with sack cloth or cocoa matting, the lower end of the deflecting plate being arranged to direct the water down into the settling chamber from which it ascends through a filter into an open chamber whence it passes through a perforated step down into the pure water chamber entirely separate and distinct from the settling chamber and extending below the filter as hereinafter more particularly explained, and, secondly, of a pipe or passage way connecting the portion of the heater above the upper filter to the portion above the filter beneath it, such passage way being provided with suitable valves, the heater being otherwise arranged and constructed in detail as hereinafter more particularly explained.

The drawing represents a sectional perspective view of my heater.

A, is the shell of a heater, which is preferably cylindrical in form and is provided with upper and lower heads, B, and, C.

D, is an exhaust steam pipe leading from the engine through the lower head, C, and, E, is an outlet pipe leading from the upper head.

F, is a central steam pipe of the heater, which is suitably supported and provided with openings, $f$, above the filter G, $f'$, $f^2$, above the filter, H, and, $f^3$, $f^4$, above the deflecting plate, I.

J, is a circular reverse saucer-shaped deflecting plate secured at the top of the central pipe, F.

K, is a circular reverse saucer-shaped deflecting plate situated above the filter, H, between the openings $f'$, and, $f^2$, and separating the upper portion, F', of the pipe from the intermediate portion, $F^2$, and, L, is the circular reverse saucer-shaped deflecting plate situated above the deflecting plate, I, between the openings, $f^3$, and, $f^4$, and separating the intermediate portion, $F^2$, from the lower portion, $F^3$, of the pipe, F.

M, is the water supply pipe, which is situated above the filter, G, and provided with a perforated end, $m$, which extends within the heater and passes through the opening, $f$. The water supply pipe, M, is provided with the usual faucet, $m'$, to regulate the supply of the water.

The deflecting plate, I, surrounds the pipe, F, and is secured at its outer edge to the cylinder. One edge, however, is straight and is turned down at, $i$.

I', is sack cloth or cocoa matting, which is secured on top of the deflecting plate, I, and is designed to retard the too rapid discharge of the water from off the deflecting plate over the edge, $i$.

N, is the settling chamber, the bottom, $n$, of which extends entirely across the cylinder with the exception of the central opening for the pipe, F. Above the bottom end and supported around the central pipe is the final filter, O.

Each of the filters, G, H, and, O, is comprised of top and bottom perforated plates, $g$, $g'$, $h$, $h'$, and, $o$, $o'$. The spaces between the plates are preferably filled with coke. The bottom filter, O, is situated a short distance above the bottom of the settling chamber and has one straight side, O', which extends upwardly past the top of the filter leaving an opening, $o^2$, beneath the bottom of the deflecting plate, I, and another straight side $O^2$, oppositely situated extending upwardly past the top of the filter and forming a step, $o^3$, which is perforated as shown. The side, $O^2$, extends down past the bottom of the filter to the bottom of the settling chamber, thus forming a separate pure water chamber, P.

Q, is a sack cloth or cocoa matting, which covers the entire perforated plate $o$, at the top of the filter and extends over the perforated step, $o^3$.

R, is the over flow pipe which is situated below the level of the top of the side, O', and, S, is the suction pipe leading to the pump.

T, is a faucet extending outwardly from the bottom of the settling chamber and designed to carry off the deposit in such chamber.

U, is a pipe which is connected by a branch pipe, U', to the heater above the upper filter, G. The branch pipe, U', is provided with the ordinary globe valve, $u$.

$U^2$, is a branch pipe leading from the lower end of the pipe U, into the interior of the heater. The pipe, $U^2$, is provided with a check valve, $u'$, and its inner end is perforated as indicated.

Having now described the principal parts involved in my invention I shall briefly describe the operation of the heater and the advantages arising from the construction of my improvements.

The water enters the heater through the perforated pipe, M. The exhaust steam passes from the engine up through the pipes, D, and, F. In passing through the pipe, F, it passes through the openings, $f^4$, where it is thrown out by the deflecting plate, L, and passes up through the openings, $f^3$, into the pipe again whence it ascends and passes up through the openings, $f^2$, where it is thrown out again up above the filter, H, by the deflecting plate, K, whence it passes into the openings, $f'$, up through the pipe and through the openings, $f$, to a point above the filter, G, where the deflecting plate, J, throws it out into this portion of the cylinder whence it passes out through the escape pipe, E.

So far the construction of the pipe and the passage of the steam are as is common in this class of heater now in use.

The action of the steam upon the water gradually heats it from top to bottom of the heater and it passes through the filters, G, and H, down upon the deflecting plate, I, which it passes slowly over and down into the settling chamber where the remaining lime, mud and quick sand will mostly settle and the water purified in a degree will pass up through the filter, O, through the perforated top and sack cloth and out through the sack cloth and perforated step, $o^3$, into the pure water chamber, P, upon reaching which it will be entirely purified.

By the construction adopted for the deflecting plate, I, and the portion situated beneath it, it will be seen that a separate chamber is provided for the pure water entirely separate and distinct from the filtering chamber. As the portion above the filter, O, and beneath the deflecting plate, I, is open at the one end it will be seen that there will be no danger of the deflecting plate being blown up as no excess of steam or vacuum can take place. The other over flow pipe, R, being situated beneath the top of the side, O', it will also be seen that there is no danger of mixing the partially filtered water with that more thoroughly filtered.

In order that the filtering of the water may not be prevented and the plant consequently shut down should the top filter become choked up with the impurities in the water I provide as hereinbefore described the pipe, U, and the branch pipes, U', and $U^2$. By turning on the valves in this pipe the water may be directed from above the filter G, to above the filter, H, and thereby a great saving of time effected as it would not be necessary to shut down the plant at all but still go on using until the end of the day when at a convenient time the upper filter may be cleansed and ready for the next day's work. It will thus be seen that the heater will be allowed to run much longer without recharging and notice will be given at the same time that the upper filter needs cleansing.

As the pure water chamber, P, is entirely separate and distinct from the filtering portion of the cylinder it will readily be understood that the suction pipe leading from the pure water chamber will not in any way interfere with or detrimentally effect the action of the filter.

What I claim as my invention is—

1. In a feed water heater and purifier, the combination with the upper filters and central pipe arranged as specified, of a slanting deflecting plate surrounding the pipe and having a straight edge designed to direct the water to the one side and to the bottom of the bottom filter, the top of the side of the filter beneath the edge of the plate extending upwardly in proximity to the deflecting plate so as to leave an opening beneath the plate as and for the purpose specified.

2. In combination with the casing, the bottom filter having a settling chamber at one side and a purified water space at the opposite side, the supply pipe passing upward centrally through the filter and the deflecting plate arranged to protect the upper surface of the filter and having a free edge located over the settling chamber, substantially as described.

3. In combination, the casing, the lower filter having a settling chamber at one side and a purified water space at the other, said filter being arranged to receive water upon its upper surface and discharge it laterally into the purified water space, the supply pipe passing upward centrally through the filter, and the deflecting plate extending over the entire upper surface of the filter but terminating over the settling chamber, substantially as described.

4. In a feed water heater and purifier, the combination with the upper filters and central pipe arranged as specified, of the slanting deflecting plate, I, settling chamber, N, filter, O, having perforated top and bottom plates, $o$, and $o'$, side plates, $O'$, and, $O^2$, located above the bottom of the settling chamber and the sack cloth, Q, covering the top perforated plate, $o$, and the perforated step, $o^3$, located below the top of the side, $O'$, and the pure water chamber, P, provided with a suction pipe, S, as and for the purpose specified.

5. In a feed water heater and purifier, the combination with the upper filters and central pipe arranged as specified, of the slanting deflecting plate, I, settling chamber, N, filter, O, having perforated top and bottom plates, $o$, and, $o'$, side plates, $O'$, and, $O^2$, located above the bottom of the settling chamber and the sack cloth, Q, covering the top perforated plate, $o$, perforated step, $o^3$, located below the top of the side, $O'$, the pure water chamber, P, provided with a suction pipe, S, and the over flow pipe, R, located below the top of the side, $O'$, as and for the purpose specified.

HENRY ESSON MOFFAT.

Witnesses:
B. BOYD,
H. G. S. YOUNG.